United States Patent Office 3,840,597
Patented Oct. 8, 1974

3,840,597
SUBSTITUTED 2-PHENOXY ALKANE-SULFONANILIDES
George G. I. Moore, Birchwood, and Joseph Kenneth Harrington, Edina, Minn., assignors to Riker Laboratories, Inc., Northridge, Calif.
No Drawing. Continuation-in-part of application Ser. No. 118,476, Feb. 24, 1971, which is a continuation-in-part of abandoned application Ser. No. 28,148, Apr. 13, 1970. This application July 3, 1972, Ser. No. 268,606
Int. Cl. C07c *143/74*
U.S. Cl. 260—556 F   31 Claims

ABSTRACT OF THE DISCLOSURE

Diphenyl ethers wherein an alkyl- or haloalkylsulfonamido substituent group is oriented ortho to the ether linkage and a nitro or amino substituent is oriented in the 4 or 5 positions with respect to the sulfonamido group are active anti-inflammatory agents.

---

This is a continuation-in-part of the copending application, Ser. No. 118,476 filed Feb. 24, 1971, and now abandoned, which is a continuation-in-part of application Ser. No. 28,148 filed Apr. 13, 1970, now abandoned.

This invention relates to diphenyl ethers substituted by an alkyl- or haloalkylsulfonamido group and a nitro or amino group (as defined herein) wherein the orientation of the groups is critical. In particular the invention relates to such compounds wherein the alkyl- or haloalkylsulfonamido group is oriented in the 2 position (ortho) with respect to the ether linkage and the nitro or amino group is oriented in the 4 or 5 position with respect to the alkyl- or haloalkylsulfonamido group, and to salts thereof. The rings and the sulfonamido nitrogen are optionally substituted. The compounds are anti-inflammatory agents. Methods for the preparation and use of the compounds are also described.

Alkysulfonamido and haloalkylsulfonamido substituted diphenyl ethers have ben alluded to heretofore. Thus, see British patents 738,758, 854,956 and 856,452, French patent 1,188,591 and U.S. Pat. 3,223,582. However, none of these patents disclose or suggest the compounds of the present invention wherein a nitro and amino group must be present, nor do they suggest the critical nature of the orientation of the substituent groups to obtain high activity. Furthermore, the pharmacological activity of the compounds of the invention is not suggested by the prior art.

Many non-steroidal anti-inflammatory agents have been discovered in recent years, and some are currently marketed for the treatment of various conditions treated by anti-inflammatory, analgetic and antipyretic agents. However, these agents have significant side-effects which prevent their use in many patients. The search for anti-inflammatory agents with reduced side effects and improved therapeutic ratio is continuing. The compounds of the present invention are effective anti-inflammatory agents with excellent therapeutic ratios.

It is therefore an object of the present invention to provide compounds which are anti-inflammatory agents.

It is another object of the invention to provide anti-inflammatory compositions containing one or more haloalkyl- or alkylsulfonamidoaryl compounds as active ingredients therein.

It is a further object of the invention to provide a method for controlling inflammation in mammalian tissue.

Still other objects will be made apparent by the following specification.

DETAILED DESCRIPTION OF THE INVENTION

According to the present invention there is provided a class of compounds of the formula

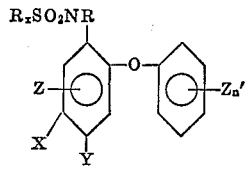

I wherein $R_x$ is an optionally halogenated lower alkyl radical, R is hydrogen, cyano, alkyl, alkylsulfonyl, haloalkylsulfonyl, a cation or

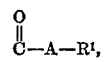

where $R^1$ is alkyl and A is oxygen or a carbon-carbon bond, X is alkoxy, alkyl, halogen, acetamido, nitro, hydrogen, amino, alkoxycarbamoyl or dialkylamino, Y is nitro, amino, alkoxycarbamoyl, dialkylamino or hydrogen, provided that one of X and Y is nitro, amino, alkoxycarbamoyl, or dialkylamino, Z is halogen, nitro or hydrogen, Z' is halogen, alkyl, alkoxy, nitro, amino alkanamido, haloalkyl, hydroxy, dialkylamino, alkoxycarbamoyl, alkylthio, alkylsulfonyl, alkanoyl, or alkylsulfinyl and n is 0–2 (zero, one or two), provided that the individual aliphatic groups appearing in the $R_x$, R, X, Y and Z moieties, including those characterized as lower alkyl, contain from one to four carbon atoms each. By alkanamido herein is meant the group

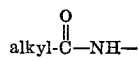

and by alkoxycarbamoyl is meant

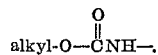

Compounds of the invention wherein R is hydrogen or a cation are presently most preferred. The compounds in which R is alkyl or alkylsulfonyl are preferred to those in which R is haloalkylsulfonyl, cyano or

When R is alkyl, alkylsulfonyl or haloalkylsulfonyl it preferably contains one carbon atom. The preferred halogens in the haloalkylsulfonyl R moieties are fluorine and chlorine. When R is

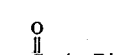

A is preferably oxygen, and R' preferably contains one or two carbon atoms.

$R_x$ may be straight or branched chain when it contains three or four carbon atoms. $R_x$ preferably contains one carbon atom. $R_x$ is preferably methyl, chloromethyl, fluoromethyl, difluoromethyl or trifluoromethyl, and most preferred is methyl.

It is preferred that n is zero or one. Most preferred is n equal to zero. When n is one, Z' is preferably oriented para or ortho, and most preferably Z' is halogen oriented para. Orientation is relative to the diphenyl ether oxygen.

It is presently preferred that Z is hydrogen. When Z is halogen it is preferably chlorine.

Most preferably X is hydrogen and Y is nitro. Other preferred combinations are those in which X is amino and Y is hydrogen; X is ethoxycarbamoyl and Y is hydrogen; X is dimethylamino and Y is hydrogen; and X is acetamido and Y is nitro.

The compounds of the invention are acidic in nature when R is hydrogen. Consequently, they form salts, i.e. compounds of Formula I wherein R is a pharmaceutically acceptable cation, or any cation which forms salts stable to ambient conditions, which salts are useful intermediates. These are generally metal, ammonium and organic amine salts and can be prepared by treating the acid form (compounds of Formula I in which R is hydrogen) with a stoichiometrically equivalent amount of an appropriate base under mild conditions. Among the metal salts of the invention are alkali metal (e.g. lithium, sodium and potassium), alkaline earth metal (e.g. barium, calcium and magnesium) and heavy metal (e.g. zinc and iron) salts as well as other metal salts such as aluminum. Appropriate bases for use in preparing the metal salts include metal oxides, hydroxides, carbonates, bicarbonates and alkoxides. Some salts are also prepared by cation exchange reactions (by reacting a salt of the invention with an organic or inorganic salt in a cation exchange reaction). The organic amine salts include the salts of aliphatic (e.g. alkyl), aromatic and heterocyclic amines, as well as those having a mixture of these types of structures. The amines useful in preparing the salts of the invention can be primary, secondary or tertiary and preferably contain not more than 20 carbon atoms. Such amines include, for example, morpholine, methyl cyclohexylamine, glucosamine, etc. These and the ammonium salts can be prepared by reacting the acid form with the appropriate organic base or ammonium hydroxide. The pharmaceutically acceptable salts are generally the alkali metal, alkaline earth, ammonium and amine salts.

The salts of the invention are frequently formed by reacting the precursors in aqueous solution. This solution can be evaporated to obtain the salt of the compound, usually as a dry powder. In some cases, it may be more convenient to use a non-aqueous solvent such as alcohols, acetone, etc. The resulting solution is then treated to remove the solvent, for example, by evaporation under reduced pressure. Since many of the salts are water soluble, they are often used in the form of aqueous solutions. Also, they can be used in making pharmaceutical preparations in the form of capsules for oral administration.

The compounds of this invention wherein R is hydrogen (the acid form) are prepared by two different methods from precursors (i.e. compounds not falling within the scope of Formula I) and, in addition, certain of the compounds of Formula I are prepared from other compounds of Formula I, as shown below.

METHOD A

This method can be generally useful when the necessary intermediates of Formula II are synthetically readily available:

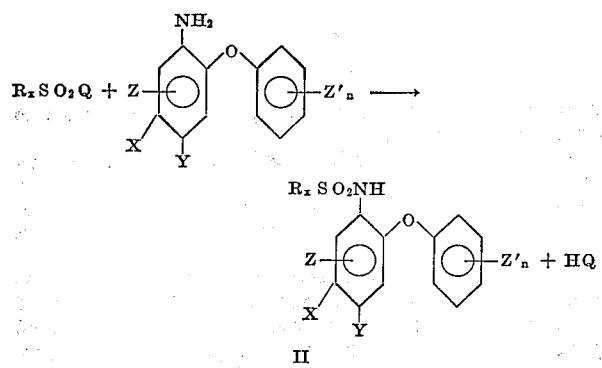

where Q is halogen or the corresponding anhydride residue, $OSO_2R_x$, and $R_x$, X, Y, Z, Z' and n are as previously defined with the exceptions that Z' is not hydroxy or amino, and X and Y are not amino. The reaction is usually run in the presence of a suitable acid acceptor, which may be an organic or inorganic base. When Q is halogen, it is preferably chlorine, except that when $R_x$ is $CF_3$, Q is preferably fluorine.

A solution of the appropriate primary arylamine of Formula II and at least an equimolar quantity of a suitable acid acceptor (such as dimethylaniline or triethylamine) in an inert organic solvent is prepared. Among the suitable solvents are glyme, benzene, dichloromethane and chloroform. An equimolar quantity of the appropriate sulfonic anhydride or halide is added to the solution. The addition is advantageously carried out at —15° to 150° C., but this may be raised or lowered if desired. In cases where the amine is of lower reactivity, it is advantageous to allow the reaction mixture to remain at reflux temperature for a few hours following addition.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

The reaction may also be run in a closed reactor. When this is done, solvent is not usually necessary, Q is usually fluorine, and an acid acceptor, generally triethylamine, is necessary. The temperatures utilized depend on the reactivity of the reactants, but may be between 0 and 200° C., and are generally 50 to 150° C.

METHOD B

Some of the compounds of the invention can also be prepared by the nucleophilic displacement reaction of a metal salt of an aromatic compound with a halogen derivative as follows:

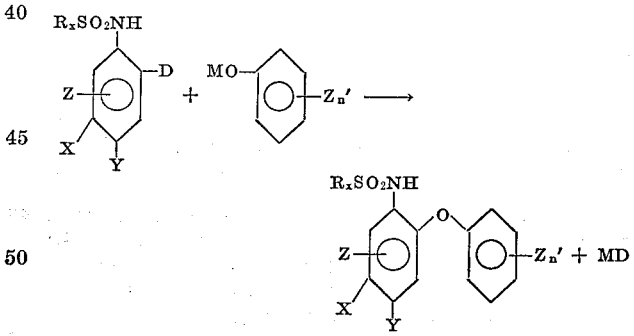

wherein D is halogen (chlorine, bromine or iodine), M is alkali metal or copper and $R_x$, X, Z, Z' and n are as defined hereinabove provided that if Z or Z' is halogen, Z or Z' is a lower atomic weight halogen than D. The substituted alkyl- and haloalkylsulfonamidobenzene derivatives are known in the chemical literature. Certain fluoroalkylsulfonamidobenzene derivatives are described in South African Patent 68/4125, or can be prepared by the methods described in said patent from known starting materials. Solvents used in the reaction are pyridine, quinoline, dimethylformamide and the like. Preferably D is bromine or iodine. When D is chlorine X must be an activating group such as nitro. Cuprous chloride is a suitable cuprous catalyst for the reaction. The alkali metal salts may be preformed or formed in situ. Temperatures of 0 to 200° C. may be used, depending upon the reactivity of the substrates. Extended reaction periods are sometimes necessary.

METHOD C

This includes the various ways in which Z, Z', and Y are changed in the compounds of Formula I. For example, compounds wherein X, Y or Z' is amino are prepared by reduction of nitro compounds; compounds wherein X, or Z is alkanamido are prepared by acylation of amino compounds; compounds of Formula I wherein R is hydrogen can be nitrated or halogenated on the phenyl rings. When Z' is alkylthio it is readily oxidized to alkylsulfinyl or alkylsulfonyl. Compounds wherein Z' is hydroxy and R is hydrogen are preferably prepared by simple hydrogen iodide cleavage of the corresponding compound wherein Z' is alkoxy. When X, Y or Z' is amino, it can be converted to dialkylamino by known methods. Compounds wherein X, Y or Z' is alkoxycarbamoyl are prepared by reaction of the corresponding aromatic amine with an alkyl chloroformate.

The preparation of compounds wherein R is hydrogen, Z is halogen or hydrogen, Z' is halogen, alkyl, alkoxy, nitro, alkylthio, alkylsulfinyl, alkylsulfonyl or alkanoyl and Y is nitro is particularly facile starting with intermediate compounds of Formula I wherein both X and Y are hydrogen, or where X is as previously defined and Y is hydrogen. Nitration with 70 percent nitric acid in acetic acid generally provides excellent yields of compounds of Formula I wherein Y is nitro. The necessary intermediates are described in Netherlands patent application 7104420 or can be prepared by methods described in said application from known starting materials. This nitration exclusively para to the sulfonamido group is surprising and unexpected because substantial ortho nitration would be predicted according to principles of electrophilic aromatic substitution.

METHOD D

This includes the various ways in which R is changed in the compounds of Formula I. Preferably in carrying out such processes to prepare compounds in which Z is hydroxy, the hydroxy is protected using conventional methods such as formation of the comparable benzyloxy compound, followed by regeneration of the hydroxy group. The preparation of the salts (wherein R is a cation) from the acid form compounds has already been discussed. To perpare the compounds of the invention wherein R is lower alkyl, compounds of Formula I wherein R is a metal ion, for example sodium or potassium, are reacted with a stoichiometric amount of alkyl bromide or iodide or a dialkyl sulfate in a non-reactive solvent such as acetone.

Compounds of the invention wherein R is cyano are prepared by reacting the corresponding compounds of the invention wherein R is a cation such as sodium or potassium with cyanogen chloride or bromide in a non-reactive solvent.

Compounds of the invention wherein R is alkylsulfonyl or haloalkylsulfonyl are prepared by reacting the corresponding compounds of the invention wherein R is a cation such as sodium or potassium with an alkylsulfonyl or haloalkylsulfonyl halide or anhydride.

Compounds of the invention wherein R is a

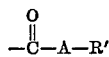

radical are prepared by reacting the corresponding compounds wherein R is a cation with an acylating agent of the formula

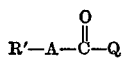   III wherein A and R' are as defined hereinabove and Q is halogen, preferably fluorine, chlorine or bromine, or the residue of an anhydride, i.e. an acyloxy group.

Suitable alkane- and haloalkanesulfonyl anhydrides and halides (for example chloride and fluorides) for use in preparing compounds of Formula I are known to the art. The primary arylamines of Formula II are also either known to the art, or may be made by methods well known to the art, generally by the reduction of the corresponding nitro compound. Conventional reduction techniques, both chemical and catalytic, are used, such as iron in acetic acid, sodium sulfide, and most commonly Raney nickel and hydrogen gas. The nitro compound precursors of the compounds of Formula II are also known to the art, or may be prepared by well known methods.

As noted previously, the compounds of the invention are active anti-inflammatory agents. Further, some are analgesic and anti-pyretic agents and some have been found to possess anti-microbial activity. The compounds are also generally active as herbicides.

The anti-inflammatory activity can be conveniently demonstrated using assays designed to test the ability of these compounds to antagonize the local edema characteristic of the inflammatory response (rat foot edema test) and to inhibit the onset of the erythematous manifestation of inflammation (guinea pig erythema test). Leading references to the rat foot edema test are:

1. Adamkiewicz et al., Canad. J. Biochem. Physio. 33:332, 1955;
2. Selye, Brit. Med. J. 2:1129, 1949 and
3. Winter, Pros. Soc. Exper. Biol. Med. 111:554, 1962.

Leading references to the guinea pig erythema test are:

1. Wilhelmi, Schweiz. Med. Wschr. 79:557, 1949 and
2. Winder et al., Arch. Int. Pharmacodyn 116:261, 1958.

Analgesic activity has been observed in standard test methods such as the phenylquinone writhing and Randall-Selitto tests. Anti-inflammatory activity may also be detected by assays known to the art such as the cotton pellet granuloma and adjuvant arthritis tests.

The compounds are preferably administered orally as anti-inflammatory agents but other known methods of administration are contemplated as well, e.g. dermatomucosally (for example dermally, rectally, and the like) and parenterally, for example by subcutaneous injection, intramuscular injection, intravenous injection and the like. Ocular administration is also included. Dosages ordinarily fall within the range of about 1 to 500 mg./kg. of body weight of the mammal to be treated although oral dosages are not usually above 100 mg./kg. and injection dosages are not usually above 50 mg./kg. Suitable forms for oral administration include liquids (such as four percent acacia suspensions), tablets (which may contain anhydrous lactose, microcrystalline cellulose, modified starch, calcium stearate and talc, as well as other conventional compounding agents together with the active anti-inflammatory agent) and capsules. Suitable carriers for topical application include creams, gels, tapes and the like. Liquid formulations, such as solutions or suspensions of the active ingredient in inert carriers, are contemplated for dosage by injection.

The presently preferred compounds of the invention with respect to anti-inflammatory activity include:

4-nitro-2-phenoxychloromethanesulfonanilide,
5-Amino-phenoxytrifluoromethanesulfonanilide,
5-Acetamido-4-nitro-2-phenoxytrifluoromethanesulfonanilide,
2-(4-Fluorophenoxy)-4-nitrotrifluoromethanesulfonanilide,
2-(2-Chlorophenoxy)-4-nitrotrifluoromethanesulfonanilide,
4-Amino-2-phenoxytrifluoromethanesulfonanilide,
4-Nitro-2-phenoxymethanesulfonanilide,
4-Nitro-2-phenoxytrifluoromethanesulfonanilide,
2-(4-Chlorophenoxy)-4-nitrofluoromethanesulfonanilide,
4-Nitro-2-phenoxyfluoromethanesulfonanilide,
4'-Nitro-2'-phenoxy-2,2,2-trifluoroethanesulfonanilide,
2-(4-Chlorophenoxy)-4-nitrotrifluoromethanesulfonanilide,
N-Methyl-4-nitro-2-phenoxymethanesulfonanilide,
N-Ethyl-4-nitro-2-phenoxyethanesulfonanilide, 5-Methyl-4-nitro-2-phenoxytrifluoromethanesulfon-
anilide,
4-Nitro-2-phenoxydifluoromethanesulfonanilide and the pharmaceutically acceptable salts of these compounds.

The compounds of the invention designated as preferred have been tested in animals in one or more assays to determine anti-inflammatory activity. All of the preferred compounds were tested in the carrageenin rat foot edema test, and were found in one or more repetitions to be active at 25 mg./kg. or less. Most of these compounds have a therapeutic ratio ($ED_{35}/LD_{50}$=T.R.) of five or more. For some compounds the $LD_{50}$ has been precisely measured, while for other compounds it is estimated.

Some compounds of the invention are acidic and are also useful as catalysts or initiators for certain polymerizations, the perfluoroalkyl derivatives being particularly useful in this regard. When so used, the compounds are mixed with the monomer or prepolymer. Suitable monomers include epoxide and vinyl ether monomers. The rate of reaction and the degree of polymerization varies depending upon the temperature at which the polymerization is carried out and the reactivity of the monomer, and heating of the polymerization reaction is generally utilized to obtain a faster polymerization rate.

The herbicidal activity of representative compounds of Formula I has been determined using screening tests against experimental plantings. Both pre- and post-emergence activity are determined in a direct screen against selected weed species. The following weed mixtures are examples of some of the weeds used for the tests.

GRASSES

Giant foxtail (*Setaria faberii*)
Barnyard grass (*Echinochloa crusgalli*)
Crabgrass (*Digitaria ischaemum*)
Quackgrass (*Agropyron repens*)

BROADLEAVES

Pigweed (*Amaranthus retroflexus*)
Purslane (*Portulaca oleracea*)
Wild Mustard (*Brassica kaber*)
Wild morning glory (*Convolvulus arvensis*)

The test chemicals are dissolved in a small amount of acetone or other suitable solvent and then diluted with water to give a concentration of 2000 p.p.m. From this concentration aliquots are diluted to give a final concentration of 500 p.p.m. Eighty ml. of this solution are added to a 6-inch pot containing the weed seeds to give a concentration equivalent to 20 lb./acre. All subsequent waterings are made from the bottom. Two pots are used per treatment. Data are taken two to three weeks after treatment and recorded as percent pre-emergence kill for each species compared to the untreated controls. Some screening is done at 40 lb./acre.

To assess post-emergence activity, the same weed mixtures are allowed to grow from 2 to 3 weeks until the grasses are approximately 1 to 3 inches and the broadleaves 1½ inches tall. They are sprayed for approximately 10 seconds or until good wetting of the leaf surfaces occurs with a 200 p.p.m. solution as described above.

Data are taken two to three weeks after treatment and recorded as percent kill for each species compared to the untreated controls.

Many of the compounds of this invention are active as herbicides. The mechanism(s) by which this herbicidal activity is effected is not presently known. However, many of the compounds of this invention also show various types of plant growth modifying activity. Plant growth modification as defined herein consists of all deviations from natural development, for example defoliation, stimulation, stunting, retardation, desiccation, tillering, dwarfing, regulation and the like. This plant growth modifying activity is generally observed as the compounds of the invention begin to interfere with certain processes within the plant. If these processes are essential, the plant will die if treated with a sufficient dose of the compound. However, the type of growth modifying activity observed varies among types of plants.

For application to plants, the compounds can be finely divided and suspended in any of the usual aqueous media. In addition, spreading agents, wetting agents, sticking agents or other adjuvants can be added as desired. Dry powders, as such or diluted with inert materials such as diatomaceous earth, can likewise be used as dusts for this purpose. The preparations are coated on the plants or the ground is covered when pre-emergence control is desired. Application is made with the usual sprayers, dust guns and the like. Application rates are at 0.5 to 20 lb./acre in general, but may be increased or reduced according to individual circumstances of use.

The anti-microbial activity of the compounds is evaluated using a variation of the original agar-plate diffusion method of Vincent and Vincent (e.g. see Vincent, J. G., and Vincent, Helen W., Proc. Soc. Exptl. Biol. Med. 55: 162–164, 1944, and Davis, B. D., and Mingioli, E. S., J. Bac. 66:129–136, 1953.

The following examples are given for the purpose of further illustrating the procedures of the present invention, but are not intended, in any way, to be limiting on the scope thereof.

All melting points in the examples are uncorrected. The boiling points and melting points are given in degrees Centigrade and the pressures in millimeters of mercury.

Examples 1 and 2 relate to the preparation of compounds of Formula I by Method A.

Example 1

4-Nitro-2-phenoxyaniline (16.2 g., 0.07 mole) is dissolved in dichloromethane (200 ml.) with 0.071 mole of triethylamine. To this solution is added trifluoromethanesulfonic anhydride (19.8 g., 0.07 mole) dropwise over one-half hour. The mixture is stirred overnight at about 25° C. An excess of ten percent sodium hydroxide is added and volatile impurities are removed by steam distillation. The base insoluble precipitate is separated by filtration, washed with dichloromethane and recrystallized from a mixture of isopropanol and isopropyl ether with concomitant treatment with decolorizing charcoal. The yellow solid product is the sodium salt of 4-nitro-2-phenoxy-trifluoromethanesulfonanilide, m.p. 281–282° C. (dec.).

Analysis.—Calculated for $C_{13}H_8F_3N_2NaO_5S$ (percent): C, 40.6; H, 2.1. Found: C, 39.8; H, 2.1.

Example 2

5-Nitro-2-phenoxyaniline (10.5 g., 0.046 mole) is dissolved in pyridine (100 ml.), methanesulfonyl chloride (5.22 g., 0.046 mole) is added and the mixture is stirred for about 16 hours. The mixture is poured into concentrated hydrochloric acid with cooling and the solid product is collected by filtration. After recrystallization twice from ethanol and treatment with decolorizing charcoal, the product, 5-nitro-2-phenoxymethanesulfonanilide, is recovered as a light tan solid, m.p. 107.5–108.5° C.

Analysis.—Calculated for $C_{13}H_{12}N_2O_5S$ (percent): C, 50.6; H, 3.9; N, 9.1. Found (percent): C, 50.6; H, 4.1; N, 9.0.

Example 3 relates to the preparation of compounds of Formula I by Method B.

Example 3

A solution of potassium hydroxide (12.3 g., 0.22 mole), 2 - chloro-5-nitrotrifluoromethanesulfonanilide (15.3 g., 0.05 mole), phenol (1.2 g., 0.05 mole), pyridine (25 ml.) and benzene (50 ml.) is stirred and heated, removing water by means of a Dean-Stark trap. After all benzene has distilled out, more pyridine (25 ml.) is added and the mixture is heated to 150° C. A small amount of cuprous chloride is added and heating is continued for several hours. The mixture is poured into water, treated with decolorizing charcoal, then acidified. The organic layer is separated and distilled. The fraction boiling at 185–195° C./0.3 mm. is solidified by scratching, recrystallized twice from hexane-toluene, then from hexane-trichloroethylene to give 5 - nitro-2-phenoxytrifluoromethanesulfonanilide, m.p. 85–87° C.

Analysis.—Calculated for $C_{13}H_9F_3N_2O_5S$ (percent): C, 43.0; H, 2.5; N, 7.7. Found (percent): C, 43.0; H, 2.4; N, 7.8.

The following compound is prepared using Method B, exemplified in Example 3.

2 - (4-fluorophenoxy) - 5-nitrotrifluoromethanesulfonanilide, m.p. 95–97° C.

Example 4 related to the preparation of compounds of Formula I by nitration of optionally substituted 2-phenoxyalkane- or haloalkanesulfonanilides.

Example 4

2-Phenoxymethanesulfonanilide (17.3 g., 0.675 mole) is dissolved in glacial acetic acid (175 ml.) by warming. The mixture is stirred and 70 percent nitric acid (5.92 g., 0.0675 mole) is added dropwise over 15 minutes. The mixture is heated on a steam bath for four hours, poured into water and the precipitate is separated by filtration. The product, 4-nitro-2-phenoxymethanesulfonanilide, is a light tan solid, m.p. 143–144.5° C. after recrystallization from ethanol.

Analysis.—Calculated for $C_{13}H_{12}N_2O_5S$ (percent): C, 50.6; H, 3.9; N, 9.1. Found (percent): C, 50.6; H, 3.8; N, 9.1.

The following compounds are also prepared using the method of Example 4.

2-(4'-Chlorophenoxy)-4-nitrotrifluoromethanesulfonanilide, m.p. 129–130° C.
5-chloro-4-nitro-2-phenoxytrifluoromethanesulfonanilide, m.p. 123–125° C.
5-methyl-4-nitro-2-phenoxytrifluoromethanesulfonanilide, m.p. 97–99° C.
5-methoxy-4-nitro-2-phenoxytrifluoromethanesulfonanilide, m.p. 133–135° C.
4-nitro-2-phenoxydifluoromethanesulfonanilide, m.p. 92–94° C.
3-Chloro-4-nitro-2-phenoxytrifluoromethanesulfonanilide, m.p. 101–102° C.
5-Acetamido-4-nitro-2-phenoxytrifluoromethanesulfonanilide, m.p. 142.5–144.5° C.
4-Nitro-2-phenoxytrifluoromethanesulfonanilide, m.p. 146–148° C.
2-(4-Fluorophenoxy)-4-nitrotrifluoromethanesulfonanilide, isolated as the triethylammonium salt, m.p. 95–98° C.
2-(2-Methylphenoxy)-4-nitrotrifluoromethanesulfonanilide, b.p. 180° C./0.6 mm.
2-(2-Chlorophenoxy)-4-nitrotrifluoromethanesulfonanilide, b.p. 190° C./0.6 mm.
2-(4-Chlorophenoxy)-4-nitrodifluoromethanesulfonanilide, m.p. 111.5–114.5° C.
2-(4-Methylphenoxy)-4-nitrotrifluoromethanesulfonanilide, m.p. 100–105° C.
2-(4-Chlorophenoxy)-4-nitrofluoromethanesulfonanilide, m.p. 137–138.5° C.
4-Nitro-2-phenoxyfluoromethanesulfonanilide, m.p. 104–105° C.
4-Nitro-2-phenoxy-n-butanesulfonanilide, m.p. 117.5–119° C.
2-(4-Chlorophenoxy)-4-nitrochloromethanesulfonanilide, m.p. 148–149.5° C.
4'-nitro-2'-phenoxy-2,2,2-trifluoroethanesulfonanilide, m.p. 143–145° C.
5-Chloro-2-(2,4-dichlorophenoxy)-4-nitromethanesulfonanilide, m.p. 163–165° C.
5-Chloro-4-nitro-2-phenoxymethanesulfonanilide, m.p. 137–139° C.
4,6-Dinitro-2-phenoxymethanesulfonanilide, m.p. 149–151° C.
5-Chloro-2-(2,4-dichlorophenoxy)-4-nitrotrifluoromethanesulfonanilide, m.p. 125–127° C.

Example 5 relates to the preparation of compounds of Formula I wherein X, Y, or Z is amino by reduction of the corresponding nitro compound.

Example 5

5 - Nitro - 2 - phenoxytrifluoromethanesulfonanilide (12.4 g., 0.0342 mole) in ethanol is reduced over palladium on charcoal at about 45 p.s.i. After hydrogen uptake is complete the mixture is filtered, then the filtrate is evaporated in vacuo to a solid which is sublimed to give white solid 5 - amino - 2-phenoxytrifluoromethanesulfonanilide, m.p. 120.5–123° C.

Analysis.—Calculated for $C_{13}H_{11}F_3N_2O_3S$ (percent): C, 47.0; H, 3.3. Found (percent): C, 47.0; H, 3.4.

The following compounds are prepared using the method of Example 5, or alternatively Raney nickel may be used as the reduction catalyst, and is generally preferred.

4-amino-2-phenoxytrifluoromethanesulfonanilide, isolated as the sodium salt, m.p. 205–207° C.
4-amino-2-(4-chlorophenoxy)trifluoromethanesulfonanilide, isolated as the triethylammonium salt, m.p. 130–140° C.
4-amino-5-methoxy-2-phenoxytrifluoromethanesulfonanilide, isolated as the triethylammonium salt, m.p. 110–120° C.
4-amino-5-chloro-2-phenoxytrifluoromethanesulfonanilide, isolated as the triethylammonium salt, m.p. 128–133° C.
5-acetamido-4-amino-2-phenoxytrifluoromethanesulfonanilide, m.p. 189–190° C. (d.)
5-amino-2-(4-fluorophenoxy)trifluoromethanesulfonanilide, isolated as the triethylammonium salt, m.p. 82–84.5° C.
4-amino-2-(4-fluorophenoxy)trifluoromethanesulfonanilide, isolated as the triethylammonium salt, m.p. 116–143° C. (d.)
4-amino-2-phenoxychloromethanesulfonanilide isolated as the hydrochloride, m.p. >95° C. (d.)
4-amino-2-phenoxydifluoromethanesulfonanilide, isolated as the triethylammonium salt, m.p. 70–100° C.
4-amino-2-(2-methylphenoxy)trifluoromethanesulfonanilide, isolated as the triethylammonium salt, m.p. 107–116° C.
4-amino-2-(2-chlorophenoxy)trifluoromethanesulfonanilide, isolated as the triethylammonium salt, m.p. 88–97° C.
N-methyl-4-amino-2-(4-chlorophenoxy)trifluoromethanesulfonanilide, isolated as the hydrochloride salt, m.p. 167–182° C.
4-amino-2-(4-chlorophenoxy)methanesulfonanilide, anilide, isolated as the triethylammonium salt, m.p. 100–125° C.
4-amino-2-(4-chlorophenoxy)difluoromethanesulfonanilide, m.p. 160–164° C.
4-amino-2-phenoxymethanesulfonanilide, m.p. 161–162.5° C.
4-amino-2-(4-methylphenoxy)methanesulfonanilide, isolated as the triethylammonium salt, m.p. 123–138° C.
4-amino-2-(4-chlorophenoxy)fluoromethanesulfonanilide, m.p. 140.5–142° C.
4-amino-2-(4-chlorophenoxy)chloromethanesulfonanilide, m.p. 118–119.5° C.
4-amino-2-phenoxyfluoromethanesulfonanilide, m.p. 126–127.5° C.

4'-amino-2'-phenoxy-n-butanesulfonanilide, m.p. 85.5–87° C.
5-amino-2-phenoxymethanesulfonanilide, isolated as the hydrochloride salt, m.p. 185–205° C.
4-amino-5-chloro-2-(2,4-dichlorophenoxy)methanesulfonanilide, m.p. 165.5–167.5° C.
4-amino-5-chloro-2-phenoxymethanesulfonanilide, isolated as the hydrochloride salt, m.p. 160° C. (d.)
N-methyl-4-amino-2-phenoxymethansulfonanilide, isolated as the hydrochloride salt, m.p. >90° C. (d.)
4'-amino-2'-phenoxy-2,2,2-trifluoroethanesulfonanilide, m.p. 95–98.5° C.
4-amino-5-chloro-2-(2,4-dichlorophenoxy)trifluoromethanesulfonanilide, m.p. 165–167.5° C.

Example 6

The sodium salt of 5-amino-2-phenoxytrifluoromethanesulfonanilide is reacted with ethyl chloroformate in acetone to provide a good yield of 5-(ethoxycarbamoyl)-2-phenoxytrifluoromethanesulfonanilide, as white needles, m.p. 116–117° C.
Analysis.—Calculated for $C_{16}H_{15}F_3N_2O_5S$ (percent): C, 47.6; H, 3.7. Found (percent): C, 47.4; H, 3.7.

Example 7

5-Amino-2-phenoxytrifluoromethanesulfonanilide is reacted with formaldehyde and formic acid according to the well-known Eschweiler-Clarke reaction and 5-(N,N-dimethylamino)-2-phenoxytrifluoromethanesulfonanilide, m.p. 127–135° C., is obtained.

Example 8

Crude 5-amino-2-phenoxytrifluoromethanesulfonanilide is dissolved in isopropyl ether and excess triethylamine is added. The mixture is stirred for six hours at room temperature, the solution is filtered and the salt is isolated by removing the volatiles in vacuo. The product is triethylammonium 5-amino-2-phenoxytrifluoromethanesulfonanilide, m.p. 130–134° C.
Analysis.—Calculated for $C_{13}H_{11}F_3N_2O_5S \cdot C_6H_{15}N$ (percent): C, 52.7; H, 6.0; N, 9.7. Found (percent): 52.9; H, 5.9; N, 9.7.
Using the procedure of Example 8 the following compounds are prepared:

Triethylammonium 5-amino-2-phenoxydifluoromethanesulfonanilide, m.p. 70–120° C. (d.)
Triethylammonium 5-nitro-2-phenoxydifluoromethanesulfonanilide, m.p. 70–74° C.

Example 9

2-(4-Chlorophenoxy)-4-nitrotrifluoromethanesulfonanilide (11.3 g., 0.0285 mole) is stirred with sodium carbonate (9.05 g., 0.085 mole) in acetone (350 ml.) for six hours, then methyl iodide (4.03 g., 0.0285 mole) is added and the mixture is stirred for about 16 hours. The mixture is filtered, evaporated in vacuo and the residue is stirred with dichloromethane and water. The dichloromethane fraction is separated, then dried over magnesium sulfate, filtered and evaporated in vacuo. The residue is recrystallized twice from a benezene-hexane mixture with concomitant treatment with decolorizing charcoal. The product, N-methyl-2-(4-chlorophenoxy)-4-nitrotrifluoromethanesulfonanilide, is a pale yellow solid, m.p. 120–122° C.
Analysis.—Calculated for $C_{14}H_{10}ClF_3N_2O_5S$ (percent): C, 40.9; H, 2.5. Found (percent): C, 41.0; H, 2.4.
The following compounds are prepared using the method of Example 9:

N-methyl-4,6-dinitro-2-phenoxymethanesulfonanilide, m.p. 135–137° C.

N-methyl-4-nitro-2-phenoxymethanesulfonanilide, m.p. 92–94° C.
N-methyl-4'-nitro-2'-(phenoxy)ethanesulfonanilide, m.p. 77.5–79.5° C.
N-ethyl-4-nitro-2-phenoxymethanesulfonanilide, m.p. 94.5–96.5° C.
N-(n-butyl)-4-nitro-2-phenoxymethanesulfonanilide, m.p. 82–84° C.

Example 10

Sodium 4-nitro-2-phenoxytrifluoromethanesulfonanilide is reacted with an equimolar amount of cyanogen bromide in acetone by stirring at room temperature overnight. The mixture is filtered and the filtrate is evaporated in vacuo to provide the product which is washed with water, then dried yielding N-cyano-4-nitro-2-phenoxytrifluoromethanesulfonanilide.

Example 11

Sodium 4-nitro-2-phenoxytrifluoromethanesulfonanilide is reacted with an equimolar amount of methanesulfonyl chloride in N,N-dimethylformamide by stirring overnight, the mixture is filtered, then evaporated in vacuo. The residue is washed thoroughly with water to provide N-methylsulfonyl-4-nitro-2-phenoxytrifluoromethanesulfonanilide.

Example 12

Sodium 4-nitro-2-phenoxytrifluoromethanesulfonanilide is reacted with ethyl chloroformate in acetone by stirring overnight. The mixture is filtered, the filtrate is evaporated in vacuo and the residue is extracted with dichloromethane. The extracts are dried over magnesium sulfate, filtered and evaporated in vacuo to provide the desired product, N-ethoxycarbonyl-4-nitro-2-phenoxytrifluoromethanesulfonanilide.

Example 13

Sodium 4-nitro-2-phenoxymethanesulfonanilide is reacted with acetyl chloride in dichloromethane by refluxing overnight. The mixture is filtered, the filtrate is evaporated in vacuo and the residue is washed thoroughly with water to provide N-acetyl-4-nitro-2-phenoxymethanesulfonanilide, m.p. 139–140.5° C.

Example 14

Sodium 4-nitro-2-phenoxytrifluoromethanesulfonanilide is reacted with a slight excess of fluoromethanesulfonyl chloride in dimethylformamide by stirring overnight, the mixture is filtered, then evaporated in vacuo. The residue is washed thoroughly with water to provide N-fluoromethanesulfonyl-4-nitro-2-phenoxytrifluoromethanesulfonanilide.
Using the procedure of Example 4 the following compounds are prepared:

4'-nitro-2'-(phenoxy)ethanesulfonanilide, m.p. 113–115° C.
5-methoxy-4-nitro-2-phenoxymethanesulfonanilide, m.p. 150–152.5° C.
2',4'-dinitro-6'-(phenoxy)ethanesulfonanilide, m.p. 108.5–110.5° C.
2-(4-methoxyphenoxy)-4-nitromethanesulfonanilide, m.p. 125–127° C.
2-(4-methoxyphenoxy)-4-nitrotrifluoromethanesulfonanilide, m.p. 78–80° C.
2-(4-methylthiophenoxy)-4-nitromethanesulfonanilide
2-(4-acetylphenoxy)-4-nitromethanesulfonanilide
2-(4-N,N-dimethylaminophenoxy)-4-nitromethanesulfonanilide
2-(4-nitrophenoxy)-4-nitromethanesulfonanilide The product shown in the following table are prepared from other compounds of the invention as described.

| Starting material | Synthetic method | Product |
|---|---|---|
| 2-(4-methylthio)-4-nitromethanesulfon-anilide. | Oxidation with hydrogen peroxide. | 2-(4-methylsulfinylphenoxy)-4-nitromethanesulfon-anilide. |
| Do. | Oxidation with excess hydrogen peroxide. | 2-(4-methylsulfonylphenoxy)-4-nitromethanesulfon-anilide. |
| 2-(4-nitrophenoxy)-5-nitromethanesulfon-anilide. | Reduction with Raney nickel. | 5-amino-2-(4-aminophenoxy)-methanesulfonanilide. |
| 4-amino-2-(4-aminophenoxy)methane-sulfonanilide. | Eschweiler-Clarke reaction. | 4-(N,N-dimethyl 1' v l-(N,N-dimethylamino-phenoxy)methanesulfon-anilide. |
| 2-(4-methoxyphenoxy)-4-nitromethane-sulfonanilide. | Hydrogen iodide cleavage. | 2-(4-hydroxyphenoxy)-4-nitromethanesulfonanilide. |
| 4-amino-2-phenoxy-trifluoromethane-sulfonanilide. | Eschweiler-Clarke reaction. | 4-(N,N-dimethylamino)-2-phenoxytrifluoromethane-sulfonanilide. |
| 5-amino-2-(4-aminophenoxy)methane-sulfonanilide. | Reaction with acetic anhydride. | 5-acetamido-2-(4-acetamido-phenoxy)methanesulfon-anilide. |
| Do. | Reaction with ethyl chloroformate. | 5-ethoxycarbamoyl-2-(4-ethoxycarbamoylphenoxy)-methanesulfonanilide. |
| 2-(4-trifluoromethyl-phenoxy)methane-sulfonanilide. | Nitration. | 4-nitro-2-(4-trifluoromethyl-phenoxy)methanesulfon-anilide. |
| 4-amino-2-phenoxy-methanesulfon-anilide. | Reaction with ethyl chloroformate. | 4-ethoxycarbamoyl-2-phenoxy-methanesulfonanilide. |

Example 15

Using the method of Example 11 and starting with 4-nitro - 2 - phenoxymethanesulfonanilide, one obtains N-methylsulfonyl - 4 - nitro-2-phenoxymethanesulfonanilide, m.p. 161–163° C.

What is claimed is:

1. A compound of the formula:

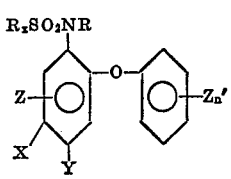

wherein $R_x$ is an optionally halogenated alkyl radical, R is hydrogen, alkyl or a pharmaceutically acceptable cation, X is alkoxy, alkyl, halogen, acetamido, nitro, hydrogen, amino, alkoxycarbamoyl or dialkylamino, Y is nitro, amino, alkoxycarbamoyl, dialkylamino or hydrogen, provided that one of X and Y is nitro, amino, alkoxycarbamoyl, or dialkylamino, Z is halogen, nitro or hydrogen, Z' is halogen, alkyl, alkoxy, nitro, amino, alkanamido, haloalkyl, hydroxy, dialkylamino, alkoxycarbamoyl, alkylthio, alkylsulfonyl, alkanoyl, or alkylsulfinyl and $n$ is 0–2, provided that the individual aliphatic groups appearing to the $R_x$, R, X, Y, and Z' moieties contain from one to four carbon atoms each.

2. A compound according to claim 1 wherein R is hydrogen.

3. A compound according to claim 1 wherein R is a pharmaceutically acceptable cation.

4. A compound according to claim 1 wherein R is alkyl.

5. A compound according to claim 1 wherein $R_x$ is alkyl.

6. A compound according to claim 1 wherein $R_x$ is haloalkyl.

7. A compound according to claim 5 wherein $R_x$ is methyl.

8. A compound according to claim 6 wherein $R_x$ is fluoromethyl.

9. A compound according to claim 6 wherein $R_x$ is difluoromethyl.

10. A compound according to claim 6 wherein $R_x$ is trifluoromethyl.

11. A compound according to claim 6 wherein $R_x$ is chloromethyl.

12. A compound according to claim 1 wherein Y is nitro.

13. A compound according to claim 1 wherein X is amino.

14. A compound of the formula $$R_xSO_2NR$$

wherein $R_x$ is methyl, fluoromethyl, chloromethyl, difluoromethyl, trifluoromethyl, ethyl or 2,2,2-trifluoroethyl, R is hydrogen, an alkyl radical containing from one to four carbon atoms or a pharmaceutically acceptacle cation, X is hydrogen, methyl, amino, nitro, dimethylamino, ethoxycarbamoyl or acetamido, Y is nitro or hydrogen, provided that if Y is hydrogen, X is amino, dimethylamino or ethoxycarbamoyl, Z is chlorine, Z' is oriented ortho and/or para to the diphenyl ether oxygen and is chloro, fluoro or methyl and $n$ is 0–2.

15. A compound according to claim 14 wherein $R_x$ is methyl.

16. The compound 4-nitro - 2 - phenoxymethanesulfonanilide according to claim 14.

17. The compound 4-nitro-2-phenoxydifluoromethanesulfonanilide according to claim 14.

18. The compound 5-methyl-4-nitro-2-phenoxytrifluoromethanesulfonanilide according to claim 14.

19. The compound 2-(4-chlorophenoxy)-4-nitrotrifluoromethanesulfonanilide according to claim 14.

20. The compound 4'-nitro-2'-phenoxy-2,2,2-trifluoroethanesulfonanilide according to claim 14.

21. The compound 4-nitro-2-phenoxyfluoromethanesulfonanilide according to claim 14.

22. The compound 2-(4-chlorophenoxy)-4-nitrofluoromethanesulfonanilide according to claim 14.

23. The compound 4-nitro-2-phenoxytrifluoromethanesulfonanilide according to claim 14.

24. The compound 4-amino - 2 - phenoxytrifluoromethanesulfonanilide according to claim 10.

25. The compound 2-(2-chlorophenoxy)-4-nitrotrifluoromethanesulfonanilide according to claim 14.

26. The compound 2-(4-fluorophenyl)-4-nitrotrifluoromethanesulfonanilide according to claim 14.

27. The compound 5 - acetamido-4-nitro-2-phenoxytrifluoromethanesulfonanilide according to claim 14.

28. The compound 5-amino - 2 - phenoxytrifluoromethanesulfonanilide according to claim 14.

29. The compound 4-nitro - 2 - phenoxychloromethanesulfonanilide according to claim 14.

30. The compound N-methyl-4-nitro - 2 - phenoxymethanesulfonanilide according to claim 1.

31. The compound N-ethyl-4-nitro-2-phenoxymethanesulfonanilide according to claim 1.

References Cited

UNITED STATES PATENTS

| | | | |
|---|---|---|---|
| 3,223,582 | 12/1965 | Bindler et al. | 260—556 A |
| 3,558,698 | 1/1971 | Harrington et al. | 260—556 F |
| 3,576,866 | 4/1971 | Robertson et al. | 260—556 F |
| 3,639,474 | 2/1972 | Harrington et al. | 260—556 F |

FOREIGN PATENTS

| | | | |
|---|---|---|---|
| 738,758 | 10/1955 | Great Britain | 260—556 A |
| 856,452 | 12/1960 | Great Britain | 260—556 A |
| 1,188,591 | 9/1959 | France | 260—556 A |
| 1,579,473 | 7/1969 | France | 260—556 F |

NATALIE TROUSOF, Primary Examiner

S. D. WINTERS, Assistant Examiner

U.S. Cl. X.R.

71—97, 103; 260—247.1, 429.9, 438.1, 439 R, 471 A, 471 C, 543 R, 543 F, 545 R, 556 A, 556 AC, 556 SN, 562 P, 571; 424—321